United States Patent [19]
Sato

[11] Patent Number: 4,591,373
[45] Date of Patent: May 27, 1986

[54] METHOD FOR MOLDING HIGH-PRECISION GLASS PRODUCTS

[75] Inventor: Bunryo Sato, Hachioji, Japan

[73] Assignee: Kabushiki Kaisha Ohara Kogaku Garasu Seizosho, Sagamihara, Japan

[21] Appl. No.: 681,910

[22] Filed: Dec. 14, 1984

[30] Foreign Application Priority Data

Dec. 29, 1983 [JP] Japan ................ 58-249247

[51] Int. Cl.⁴ ............................... C03B 23/00
[52] U.S. Cl. ........................... 65/29; 65/102; 65/104; 65/106
[58] Field of Search ............. 65/29, 102, 103, 104, 65/106

[56] References Cited

U.S. PATENT DOCUMENTS 4,435,200  3/1984  Joormann et al. ............ 65/102 X
4,481,023  11/1984  Marechal et al. ............ 65/106 X

*Primary Examiner*—Arthur Kellogg
*Attorney, Agent, or Firm*—Ladas & Parry

[57] ABSTRACT

A method is provided for molding high-precision glass products where a piece of glass is heated at least in its surface portion and pressed between a pair of molds. Relative movement of the molds toward each other during the pressing is caused to follow change in dimension of a heated interval control member provided between the pair of molds, the interval control member having a coefficient of thermal expansion which is equal to or larger than that of the glass piece and therefore being capable of thermal contraction in the pressing direction by an amount which is substantially equivalent to or larger than that of the glass piece in the pressing direction due to cooling of the glass piece, and the change in dimension of the interval control member being caused by thermal contraction due to cooling thereof.

2 Claims, 6 Drawing Figures

METHOD FOR MOLDING HIGH-PRECISION GLASS PRODUCTS

BACKGROUND OF THE INVENTION

This invention relates to a novel method for molding a heated piece of glass into glass products, in particular optical lenses, having high surface accuracy and thickness accuracy.

For obtaining optical elements made of glass, there has been practiced a method which, replacing an old, traditional method depending upon grinding, is directed to obtaining a molded glass product directly by preparing a glass piece for each piece of a desired optical element and pressing this glass piece between mold surfaces of a pair of molds. This prior art method, however, has the disadvantage that the molding step is not sufficient for achieving desired surface accuracy and surface quality and desired accuracy in dimensions including thickness of lens and, accordingly, cumbersome subsequent operations including coarse abrasion and precision grinding are required with a result that extra time and labor must be spent.

Various techniques have been proposed and practiced for obviating the above described operations subsequent to the molding. It is desired that finished products made according to these techniques generally should have surface quality, i.e., surface roughness, of within $\pm 0.02$ $\mu$m, surface accuracy of within six Newton's rings, irregularity of within $\lambda/2$ and thickness accuracy of within about $\pm 50$ $\mu$m.

For satisfying these requirements, considerations should be given to such factors as glass composition suitable for this type of molding, metering of a glass piece to be molded with a suitable amount of surplus taken into account, dimensions and shape, surface quality and other qualities, a heat treatment of the glass piece as a pretreatment and temperature distribution in the glass piece immediately before molding, a method for supporting the glass piece, material used for a molding surface of a mold, surface quality, surface accuracy and a dimensional design with contraction after molding taken into account, temperature of the mold, accurate symmetrical positioning of the molds, timing of contact and fitting of the molds against the glass piece, pressure of molding by the molds and viscosity or value of plastic flow and volume resulting from fall in the temperature of the glass piece or change in dimensions due to contraction in the pressing direction and the moving speed and distance of displacement and stop of moving of the molds corresponding to such change in dimensions and accurate control of relative position of and interval between the molds, and time of holding the molded glass in the molds.

Among these factors to be considered, the moving speed of the mold in the final stage of molding of the glass piece is, in the case of normal optical lenses, 0.5~2 $\mu$m per second in the fastest case and the distance of displacement is several $\mu$m to several tens $\mu$m in terms of the entire moving distance. Accuracy in controlling of the moving speed and distance of displacement, however, greatly affects the accuracy of the optical element.

It is an object of the invention to provide a novel method capable of accurately controlling the moving speed and distance of displacement of the mold among the above described various factors to be considered. In one aspect of the invention, there is also provided a method for accurately controlling the timing of stopping the movement of the mold in the molding step.

For achieving the above described object of the present invention, these is provided a method for molding high-precision glass products by heating and softening a piece of glass at least in the surface portion thereof and molding the glass piece by pressing the same between molding surfaces of a pair of molds comprising the step of causing relative movement of the molds toward each other during the pressing to follow change in dimension of a heated interval control member provided between said pair of molds, said interval control member having a coefficient of thermal expansion which is equal to or larger than that of the glass piece and therefore being capable of thermal contraction in the pressing direction by an amount which is substantially equivalent to or larger than that of the glass piece in the pressing direction due to cooling of the glass piece, and said change in dimension of said interval control member being caused by thermal contraction due to cooling thereof.

According to the invention, movement of the mold during pressing is controlled by an interval control member which is provided as a different member from the molds but is in intimate contact with the molds. The material of this interval control member is selected from materials having a coefficient of thermal expansion which is equal to or larger than the coefficient of thermal expansion of the glass piece to be pressed (temperature range of measurement being below a strain point) and the relative movement of the molds during pressing therefore follows change in dimension caused by thermal contraction of the interval control member (i.e., decrease in the dimension of the interval control member which is equivalent to or larger than decrease in the thickness of the glass piece in the pressing direction caused by thermal contraction) whereby pressure of the molding surfaces of the molds against the glass piece and the moving speed of the molds can be accurately controlled.

According to another aspect of the invention, there is provided a method for molding high-precision glass products as defined in claim 1 further comprising the step of detecting, when an interval between the opposing molding surface of said pair of molds during pressing of the glass piece has been reduced to a value at which the relative movement of the molds should be terminated, a predetermined temperature corresponding to said value of said interval control member which has been contracting with the accompanying relative movement of the molds and transmitting a detection signal to a control system controlling the movement of the molds to terminate the relative movement of the molds.

According to the above described aspect of the invention, temperature of the interval control member is detected at a time point when the interval between a pair of molds has reached a predetermined distance following decrease in the dimension of the interval control member to a predetermined value due to thermal contraction caused by fall in the temperature, and a detection signal is transmitted to a mold movement control system to terminate the movement of the mold whereby the interval between the molding surfaces of the molds in the final stage of pressing is accurately controlled.

BRIEF DESCRIPTION OF THE DRAWINGS

In the accompanying drawings which illustrate states in respective steps of main component parts employed in carrying out an embodiment of the method according to the invention.

FIGS. 4(I) and 4(II) are a side view and a plan view of a support member used in another embodiment of the invention.

DESCRIPTION OF PREFERRED EMBODIMENT

Examples embodying the invention will now be described with reference to the accompanying drawings.

EXAMPLE 1

In Example 1, a meniscus type convex lens having an outer diameter of 12 mm, a center thickness of 2.930 mm and radius of curvature shown in Table 1 is formed from a boro-lanthanum glass.

Figure 1:
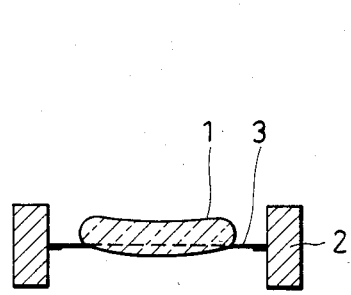
FIG. 1 is a vertical section showing a state in which the glass chunk is heated and softened.

As shown in FIG. 1, a disk-like glass piece 1 consisting of a predetermined amount of a boro-lanthanum glass and having a diameter slightly larger than the diameter of molding surfaces of molds is placed on an annular support member 3 consisting of a thin plate of brass which is hung on an inner wall of a spacer 2 of a short cylindrical configuration. The spacer 2 is made of stainless steel having a coefficient of linear expansion of $180 \times 10^{-7}/°C.$, which is larger than the coefficient of linear expansion of the glass, and performs a function as a member controlling the interval between a pair of molds. The set of glass piece 1, spacer 2 and support member 3 is gradually heated in a quartz pipe (not shown) for more than 10 minutes to 690° C. which slightly exceeds 682° C., the strain point of the glass, while the temperature of the set is measured by an infrared radiating thermometer (not shown) having an accuracy of ±1° C. Then the glass is heated by a known external heat source for a short period of time through 700° C. which is the transformation point up to 764° C. which exceeds 742° C., the softening point. The spacer 2 is heated by this rapid heating to 757° C. and thereby expands, increasing its dimension in the pressing direction. As for the glass piece, upper and lower surfaces thereof only are heated to 764° C. ($10^{6.7}$ poise) by the rapid heating resulting in creation of a large difference in temperature, and therefore in viscosity, between the outside and inside portions of the glass piece.

Figure 2:
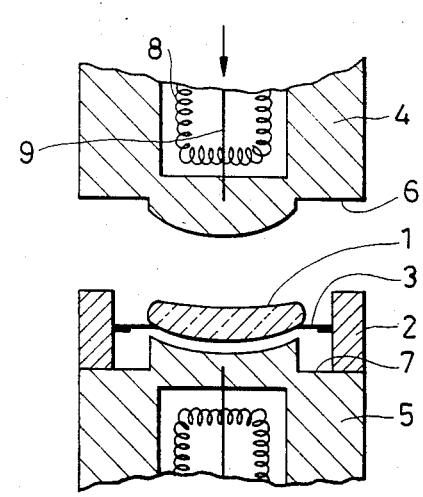
FIG. 2 is a vertical section showing a state immediately prior to start of a pressing operation.

Then, the glass piece 1 and the spacer 2 are placed, as shown in FIG. 2, between an upper mold 4 and a lower mold 5 which are opposed to each other and constitute a pair. The upper mold 4 and the lower mold 5 are heated at a constant temperature of 675° C. which is lower than 700° C., the glass transformation point, by a heating element 8 provided in each of the molds 4 and 5. In this example, the spacer 2 is placed at its lower end surface on a stepped portion 7 formed about the outer periphery of a concaved molding surface of the lower mold 5 and an annular chamber thereby is defined between the outer periphery of the molding surface of the lower mold 5 and the inner wall of the spacer 2. The glass piece 1 is positioned in such a manner that a slight interval is provided between the lower surface thereof and the concaved molding surface of the lower mold 5.

Figure 3:
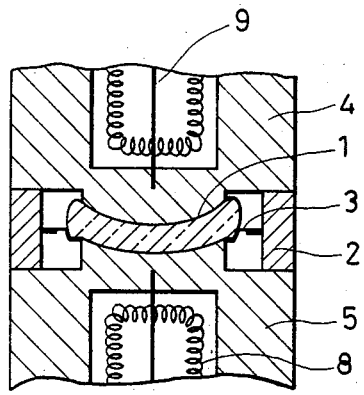
FIG. 3 is a vertical section showing a state between start and end of movement of a mold during pressing.
Figure 4:
Figure 4:
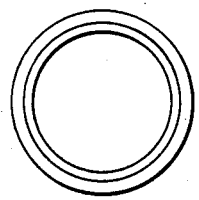

After setting of the glass piece 1 in position, the upper mold 4 is displaced downwardly as shown in FIG. 3 and the convexed molding surface thereof is brought into contact with the upper surface of the glass piece 1. The glass piece 1 is pushed downwardly by the upper mold 4 with the upper and side surfaces of the glass piece 1 being slightly deformed and, after a short period of time, the lower surface of the glass piece 1 is brought into contact with the molding surface of the lower mold 5 and thereupon pressing of the glass piece 1 is started. The pressing progresses with a surplus amount of the glass flowing through a gap between the outer peripheries of the molding surfaces of the upper and lower molds 4 and 5 into the chamber between the spacer 2 and the outer peripheries of the molding surfaces of the molds 4 and 5. The support member 3 is made of a material having a sufficient deformability and readily deforms under the pressure of plastic flow of the surplus amount of the glass piece 1 so that the support member 3 never prevents the flowing of the surplus glass.

Slightly after starting of pressing of the glass piece 1, a stepped portion 6 about the molding surface of the upper mold 4 is brought into contact with the upper end surface of the spacer 2 and thereafter the upper and lower end surfaces of the spacer 2 are in intimate contact with the stepped portions 6 and 7 of the upper and lower molds 4 and 5 so that the pair of molds 4 and 5 hold the spacer 2 with a pressing pressure of about 48 kg/cm² until the end of pressing of the glass piece 1 and the interval between the molding surfaces of the molds 4 and 5 is controlled by the dimension of the spacer 2 which is determined by thermal contraction of the spacer 2 in the pressing direction due to fall of the temperature.

When the pressing is started, supply of heat from the heating elements 8 in the molds 4 and 5 is stopped, and heating of the molds 4 and 5 thereby is stopped. After starting of the pressing therefore, the temperature of the molds once rises on account of the high heat in the surface portion of the glass piece 1 but immediately thereafter the molds start to dissipate heat and the temperature of the molds falls faster than that of the surface of the glass piece 1. On the other hand, the spacer 2 which has been heated at about the same temperature as the surface of the glass piece 1 dissipates heat to the atmosphere and also transmits it to the upper and lower molds 4 and 5, for there is an interval between the spacer 2 and the glass piece 1 and, accordingly, the temperature of the spacer 2 falls faster than that of the glass chunk 1.

The decrease in the interval between the molding surfaces of the upper and lower molds 4 and 5 produced during the pressing step is controlled, as described above, by the amount of contraction of the spacer 2 in the pressing direction resulting from cooling of the spacer 2.

During the pressing, the glass piece 1 transmits heat mainly to the molding surfaces of the molds 4 and 5 and the surface temperature of the glass piece 1 thereby falls to a point in the vicinity of its inside temperature with a result that temperature distribution is gradually averaged and the glass piece 1 as a whole has been cooled to the vicinity of the strain point of the glass when the pressing has been completed. In the meanwhile, the upper and lower surfaces of the glass piece 1 which is subjected to pressure applied by lowering of the upper mold 4 are brought into intimate contact with the molding surfaces of the molds 4 and 5. Configurations of the molding surfaces therefore are accurately copied by the surface of the glass piece 1 and a surplus amount of the glass flows out of the space between the molding surfaces. As time elapses and the temperature falls, the glass piece 1 gradually contracts and becomes hard to deform. Since the spacer 2 continues to contract all this time with an amount of contraction being equivalent to or larger than the amount of contraction of the glass piece 1 in the pressing direction, the glass piece 1 receives a sufficient pressure and, accordingly, the close, fitting contact between the molding surfaces of the molds 4 and 5 and the upper and lower surfaces of the glass piece 1 is maintained throughout the pressing step whereby deterioration in surface accuracy and surface quality of the optical surface of a lens to be molded due to the thermal contraction, such as shrinking due to cooling, is effectively prevented and an accurate copying of the molding surfaces is ensured.

The dimension of the spacer 2 in the pressing direction corresponding to the interval between the molding surfaces of the molds 4 and 5 necessary for obtaining a finished lens with a predetermined thickness, i.e., a point at which the upper mold 4 stops its movement, and the amount of contraction and the temperature of the spacer 2 corresponding to this dimension have previously been confirmed by calculation and experiment. When, accordingly, the temperature of the spacer 2 has reached a point corresponding to a necessary amount of contraction, the temperature of the surface of the spacer 2 is detected and supplied to a movement control mechanism for the upper mold 4 to stop the downward movement of the upper mold 4. The detection of the temperature can be accurately performed by a known technique within an error range of ±1° C. When the movement of the upper mold 4 stopped, the temperature of the upper mold 4 was 664° C. and that of the lower mold 5 was 668° C. Immediately thereafter the upper mold 4 was lifted and the surface temperature of the molded glass product was measured. It was 673° C. Thereafter, the molded product is taken out with the spacer 2 and is annealed if necessary. A peripheral edge formed by the surplus glass is removed from the molded product and a finished product thereby is produced.

According to the above-described method, the glass piece 1 can be molded into an optical element having a very accurate surface accuracy and surface quality. One hundred glass lenses obtained by the molding method of this example all have a surface roughness of its optical surface within ±0.02 μm, surface accuracy of the optical surface within 3 Newton's rings with respect to a reference curvature, an irregularity of within λ/4 and thickness accuracy of within ±10 μm.

EXAMPLE 2

In Example 2, a meniscus type concaved lens having an outer diameter of 32 mm, a center thickness of 2.450 mm and a radius of curvature as shown in Table 1 is formed from a lead-silicate glass.

Figure 5:
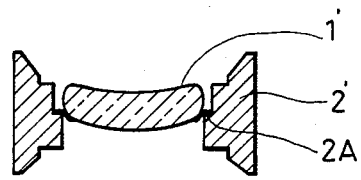
FIG. 5 is a vertical section showing a state corresponding to that of FIG. 1 in the other embodiment of the invention.

In this example, the interval control member is constructed of a spacer 2' having a stepped portion 2A in its inner periphery as shown in FIG. 5. As the support member, a support member 3' having a recessed portion 3A of a sloped shoulder shape formed inside thereof is employed. This support member 3' is advantageous over the support member 3 of FIG. 1 in positioning of a glass piece 1', for the bottom portion of the glass piece 1' generally fits the recessed portion 3A of support member 3'.

The spacer 2' is made of a special stainless steel having a coefficient of a linear expansion of $180 \times 10^{-7}/°$ C. which is larger than that of the glass to be molded. As the glass piece 1', glass having a strain point 413° C., a transformation point of 440° C. and a softening point of 590° C. is used.

The glass piece 1' is preheated to 420° C. and then rapidly heated so that the surface temperature will rise to 645° C. ($10^{6.3}$ poise) The glass piece 1' is molded with the temperature of the spacer 2' being adjusted to 641° C. and that of the mold to 425° C. The movement of the upper mold 4 in the pressing direction is stopped at the spacer temperature of 524° C. whereupon the pressing is ended. At this time, the temperature of the upper mold 4 is 401° C., that of the lower mold is 402° C., and the surface temperature of the molded glass product is 409° C. In the present example, other molding conditions are the same as in Example 1.

All of one hundred lenses obtained by carrying out the method of this example have a surface roughness of within ±0.01 μm, a surface accuracy of within 3 Newton's rings, an irregularity of within λ/4 and a thickness accuracy of within ±7 μm.

The following Table 1 comprehensively shows molding conditions of Examples 1 and 2 and Table 2 shows results of measurements of the surface accuracy, surface roughness and thickness of the molded product.

TABLE 1

| condition | | Example 1 composition boro-lanthanum | Example 2 composition lead-silicate |
|---|---|---|---|
| physical properties of glass | softening point ($10^{7.6}$ poise) (°C.) | 742 | 590 |
| | transformation point ($10^{13.4}$ poise) (°C.) | 700 | 440 |
| | strain point ($10^{14.5}$ poise) (°C.) | 682 | 413 |
| | coefficient of expansion ($\times 10^{-7}/°$C.) | 72 | 98 |
| lens | outer diameter (mmφ) | 12.0 | 32.0 |
| | radius of curvature of first surface (mmR) | concave 41.38 | concave 45.28 |
| | radius of curvature of second surface (mmR) | convex 18.82 | convex 214.0 |
| | center thickness (mm) | 2.930 | 2.450 |
| | shape of lens | meniscus convex lens | meniscus concaved lens |
| glass piece | surface temperature (°C.) | 764 ± 1 | 645 ± 1 |
| | viscosity (poise) | $10^{6.7}$ | $10^{6.8}$ |

TABLE 1-continued

|  |  |  | Example 1 | Example 2 |
|---|---|---|---|---|
|  |  |  | composition | |
| condition |  |  | boro-lanthanum | lead-silicate |
|  | at starting of pressing |  |  |  |
|  | surface temperature (°C.) at stopping of mold movement |  | 673 ± 4 | 409 ± 5 |
|  | approximate maximum amount of contraction (μm) |  | 5.0 | 33.1 |
| spacer | material |  | SUS 310S | SUH 309 |
|  | length (mm) |  | 15.382 | 18.224 |
|  | coefficient of expansion ($\times 10^{-7}$/°C.) |  | 180 | 180 |
|  | temperature (°C.) at starting of pressing |  | 757 ± 3 | 641 ± 4 |
|  | temperature (°C.) at stopping of mold movement |  | 650 ± 5 | 524 ± 5 |
|  | amount of contraction (μm) |  | 29.6 | 38.4 |
| mold | temperature (°C.) immediately before pressing |  | 675 ± 2 | 425 ± 2 |
|  | temperature (°C.) at stopping of mold movement mold | upper mold | 664 ± 2 | 401 ± 2 |
|  |  | lower mold | 668 ± 2 | 402 ± 2 |

TABLE 2

|  |  |  | Example 1 | Example 2 |
|---|---|---|---|---|
| surface accuracy | first surface | curvature tolerance | within N ± 2 | N ± 3 |
|  |  | irregularity | within λ/4 | within λ/4 |
|  | second surface | curvature tolerance | within N ± 3 | within N ± 1 |
|  |  | irregularity | within λ/4 | within λ/4 |
| surface roughness |  |  | within ±0.02 μm | within ±0.01 μm |
| thickness (3σ) |  |  | within 10μ | within 7μ |

Supplementary explanation will now be made about the method according to the invention.

For carrying out the invention, glass of any composition may be used and a product of any size and shape may be molded. The invention is applicable to manufacture of spherical and aspherical lenses and various other optical elements including a prism and other light-passing elements suitable for molding.

As regards the shape of a glass piece, a disk-like shape as shown in the above-described examples is convenient in that it facilitates molding. The shape of the glass piece, however, is not limited to the disk-like one but any shape suitable for obtaining the shape of an object product may be employed. An amount of glass of the glass piece should preferably be somewhat larger than that of a finished product taking a metering error into account and, if there is a surplus glass material in molding the product, the surplus amount is caused to flow out of the molding surfaces of the molds. For this purpose, the interval control member is disposed in the vicinity of the outer periphery of the molding surfaces with some interval provided between the inner periphery of the interval control member and the outer periphery of the molding surfaces.

As the interval control member, a rigid material having a larger coefficient of expansion than the material glass is used. The material for the interval control member, however, is not limited to the metal material composition of the above-described examples. For example, the interval control member may be heat-treated or surface-treated or partly replaced by a more rigid material for preventing wear occurring in using the interval control member.

The interval control member may be located in a suitable position in which the member can be in intimate contact with the upper and lower molds and thereby it can control the movement of the mold or the interval between the molds. In case the interval control member is disposed beside the outer periphery of the molding surfaces of the molds, the interval control member need not be of a short cylindrical shape but, for example, may be composed of a plurality of disk-like or columnar spacer components of any cross-sectional shape assembled together. In short, the interval control member has only to be located in a position in which it contacts a part of each of a pair of molds outside of opposing molding surfaces of the molds and has strength and shape capable of controlling the interval between the molds against the pressure of pressing.

In a case where the cylindrical spacer is employed as the interval control member, its shape, particularly the shape of its inside surface, should be suitably designed. For instance, there may be provided a stepped portion in the middle of the inner peripheral wall so that the bottom peripheral portion of the glass piece may be supported on the stepped portion.

In a case where the cylindrical spacer as shown in the above-described examples is used as the interval control member, it is generally advantageous to support the bottom peripheral portion of the glass piece by a support member in the form of a thin plate which is separate from the spacer.

The interval control member is conveniently heated on the occasion when the glass piece is rapidly heated before the pressing step but may be heated separately from the glass piece depending upon the location and other conditions of the interval control member.

The support member should preferably be made of a material which has deformability at a molding temperature and, when a surplus amount of the pressed glass piece flows out, is deformable by this flowing surplus glass. Soft metal plates of various types satisfy this condition. A releasing agent may be used for the support member when required.

The support member may be of a flat annular shape as in the Example 1 and, more preferably, may be of a shape such that the inner edge portion of a ring changes progressively in a gradual curve and, when the support member is set between the molds, it assumes a downwardly concaved shape. This shape facilitates positioning of the glass piece on the support member. It will be understood that the support member need not be of a perfect annular shape but may be of a polygonal shape, may be partly recessed or may have a hold.

The support member may be hung on the cylindrical spacer or placed on the stepped portion formed in the inner wall of the spacer. Depending upon the interval between the interval control member and the molding surfaces of the molds, a holding member may be placed on the upper portion of the lower mold and the support member may be disposed on this holding member. In this case, the support member should preferably be detachable from this holding member.

Heating of a glass piece before molding may be performed in a conventional manner, i.e., heating the entire glass chunk to a predetermined uniform temperature above a transformation point at which the glass is moldable.

As regards a mold, various materials which are suited to a precision surface finishing may be used. A mold made of stainless steel is most frequently used. A mold having a molding surface made of a hard metal material covered with a precious metal material or a mold having a known molding surface made of silicon carbide or silicon nitride or other ceramic which is of a small coefficient of expansion may also be used. In any case, since a molded glass product is often required to have accuracy of surface roughness of ±0.02 μm, the mold must have a molding surface capable of molding such a precision product. The mold should preferably be of a type which is heated by an internal heat source in a known manner and the temperature of the mold can be detected or a type in which supply of heat is controlled in accordance with input data from outside.

Summing up the pressing step of the present invention, the interval control member is heated to a temperature in the vicinity of the temperature of the entire glass piece or the surface temperature of the glass piece, regardless of whether there is difference in temperature between the inside portion and the surface portion of the glass piece in a state before start of pressing. The temperature of the molding surfaces of the molds should preferably not exceed the glass transformation point.

Simultaneously with contacting of the molding surface of one displacing mold with one surface of the glass piece, or after such contacting as in the above-described examples, the molding surface of the other mold contacts the other surface of the glass piece and pressing thereby is started. The temperature of the mold thereafter is controlled in accordance with a predetermined cooling schedule.

In the pressing step, while pressing progresses with the interval between the pair of opposing molds being gradually narrowed, the glass piece is cooled by transmission of heat mainly through the molds and the molds and the interval control member dissipate heat outside and thereby their temperature falls.

When the pressing has been completed, the temperature of the molded glass product and that of the molds both have fallen to a temperature in the vicinity of the strain point of the glass.

In the present invention, the molding operation of the molds is controlled in accordance with thermal contraction in the pressing direction of the interval control member provided between the molds, i.e., the dimension of the interval control member in the pressing direction.

There is a functional relation between the temperature of the interval control member and the dimensional change due to contraction. Accordingly, temperature, and therefore dimension of the interval control member in the pressing direction, at which the pressing operation of the molds should be stopped can be previously determined by calculation and experiment and, when the predetermined temperature or dimension of the interval control member has been attained, the information of either the temperature or dimension is supplied through a suitable electronic control circuit to a movement control mechanism for the mold to terminate the movement of the mold. It is more convenient to obtain temperature information from the interval control member than to obtain dimension information. Temperature information can be readily obtained at a sufficiently high accuracy by a conventional measuring method whereas dimension information measured by a known method tends to become inaccurate, for measurement is made about a highly heated member. Alternatively, interval between the molds or temperature of the molds which show the temperature of the interval control member indirectly may be measured instead of directly obtaining the temperature information of the interval control member and terminating of movement of the mold may be controlled by such indirect information. The control by the temperature information from the interval control member, however, is most preferable for carrying out the invention.

After the molded product has reached a proper temperature, the molded product is removed from the molds by taking it out with the interval control member or by inverting the molds. The molded product is annealed as required and the surplus portion is removed to provide a finished product.

The method according to the invention is suitable for forming an optical element from a solid glass piece which has been prepared by cutting a bar-like glass and metering it to a predetermined amount. It is however possible to cut softened glass into a softened glass piece of a predetermined amount and insert, when the temperature of the glass piece is suitable for molding, this softened glass piece between a pair of molds using an interval control member which has been heated to a predetermined temperature.

The pair of molds may be so designed that either one of them only is moved for the molding operation or that both of them are moved, starting the movement simultaneously or at different times. In any case, it is not advantageous that one surface of the glass piece contacts one molding surface and after lapse of a relatively long time the other surface of the glass piece contacts the other molding surface. It is desirable that the contacts between the two surfaces of the glass piece and the two molding surfaces should be made simultaneously or successively within a relatively short period of time of a few seconds.

According to the method of the present invention, a molded glass product with a surface accuracy of an optical surface within 6 Newton's rings, irregularity of within λ/2 and surface roughness of within ±0.02 μm can be obtained with a relatively simple device. Further, thickness accuracy of the molded glass product within ±50 μm can be obtained. Accordingly, the method according to the information is suitable for producing an optical element with an excellent surface accuracy and an accurate thickness specification.

What is claimed is:

1. A method for molding high-precision glass products by heating and softening a piece of glass at least in the surface portion thereof and molding the glass piece by pressing the same between molding surfaces of a pair of molds comprising the step of causing relative movement of the molds toward each other during the pressing to follow change in dimension of an interval control member heated according to a temperature control independent of temperature control for heating said molds provided between said pair of molds, said interval control member having a coefficient of thermal expansion which is substantially equal to or larger than that of the glass piece and therefore being capable of thermal contraction in the pressing direction by an amount which is substantially equivalent to or larger than that of the glass piece in the pressing direction due to cooling of the glass piece, and said change in dimension of said interval control member being caused by thermal contraction due to cooling thereof.

2. A method for molding high-precision glass products as defined in claim 1 further comprising the step of detecting, when an interval between the opposing molding surface of said pair of molds during pressing of the glass piece has been reduced to a value at which the relative movement of the molds should be terminated, a predetermined temperature corresponding to said value of said interval control member which has been contracting with the accompanying relative movement of the molds and transmitting a detection signal to a control system controlling the movement of the molds to terminate the relative movement of the molds.

* * * * *